(12) United States Patent
Cowley et al.

(10) Patent No.: US 8,787,670 B2
(45) Date of Patent: Jul. 22, 2014

(54) SOFTWARE FOR TEXT AND IMAGE EDIT RECOGNITION FOR EDITING OF IMAGES THAT CONTAIN TEXT

(76) Inventors: Victor John Cowley, Miami, FL (US); Simon William Yearwood, Geneva (CH)

( * ) Notice: Subject to any disclaimer, the term of this patent is extended or adjusted under 35 U.S.C. 154(b) by 156 days.

(21) Appl. No.: 13/586,608

(22) Filed: Aug. 15, 2012

(65) Prior Publication Data

US 2013/0121579 A1  May 16, 2013

Related U.S. Application Data

(60) Provisional application No. 61/523,485, filed on Aug. 15, 2011.

(51) Int. Cl.
*G06K 9/36* (2006.01)
*G06K 9/46* (2006.01)

(52) U.S. Cl.
USPC .......................................................... 382/176

(58) Field of Classification Search
None
See application file for complete search history.

(56) References Cited

U.S. PATENT DOCUMENTS 5,570,435 A * 10/1996 Bloomberg et al. .......... 382/283
2008/0144131 A1* 6/2008 Jung et al. ..................... 358/474
2009/0196475 A1* 8/2009 Demirli et al. ................ 382/128

OTHER PUBLICATIONS

Stubberud et al., "Adaptive image restoration of text images that contain touching or broken characters", Proc. 3rd ICDAR, vol. 2, pp. 778-781 1995.*

* cited by examiner

*Primary Examiner* — Bhavesh Mehta
*Assistant Examiner* — Feng Niu

(57) ABSTRACT

Software for editing text and images enables a user to select a portion of an image and read the text on the selected image portion via an OCR function. The software enables the user to apply a mask containing the originally read text, that allows the user to type or paste new text to replace the previously read text in the selected image portion. The software also enables a user to edit images by automatically recognizing the borders of fields and/or columns and the background color. As a result the user can easily modify an image by applying a mask to an image wherein the mask has new data such as different text the identical background color or a different background color or different layout etc. and which may be placed exactly on the recognized borders of the original image.

10 Claims, 9 Drawing Sheets

SOFTWARE FOR TEXT AND IMAGE EDIT RECOGNITION FOR EDITING OF IMAGES THAT CONTAIN TEXT

CROSS-REFERENCE TO RELATED APPLICATION

This application claims the benefit of priority of U.S. provisional application No. 61/523485, filed Aug. 15, 2011, the contents of which are herein incorporated by reference.

BACKGROUND OF THE INVENTION

The present invention relates to image editing software and, more particularly, to software for recognizing the edges or borders of lines in an image for easy editing.

Training materials and technical documentation frequently contain images such as computer screenshots. Updating such images requires access to the subject system in its original form, which is frequently no longer available.

Current editors require extensive trial and error to match colors and do not allow easy editing of text and do not auto-fit the text to a selected portion of an image.

Therefore, there is need for software that can easily enable editing of images of documentation and measurably reduce the time it takes to edit said images as either an automatic or manual process.

SUMMARY OF THE INVENTION

In one aspect of the present invention, a document-processing computer-implemented method enables a user to edit an image containing both text and non-text elements, where the method includes a component for selecting a specific area of the image; an Optical Character Recognition component for recognizing the text elements in the selected area; an Edge Recognition component for recognizing boundaries in the selected area.; and a component for applying a mask to the selected area where a user is able to manipulate the mask before rendering the mask into the image.

These and other features, aspects and advantages of the present invention will become better understood with reference to the following drawings, description and claims.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Broadly, an embodiment of the present invention provides a method for editing images where masks are applied to cover any existing fields in an image. The masks auto-fit to the field outline, recognize the background color and identify any existing text by Optical Character Recognition (OCR). Any text that is present on the image is recognizable and can be edited and replaced. The colors are also are changeable at will.

An exemplary embodiment of the invention features a software application or a suite of applications which can display or process an object. A user is able to execute the application on a computer, mobile phone, smartphone, tablet, netbook, and any other similar device.

Figure 1:
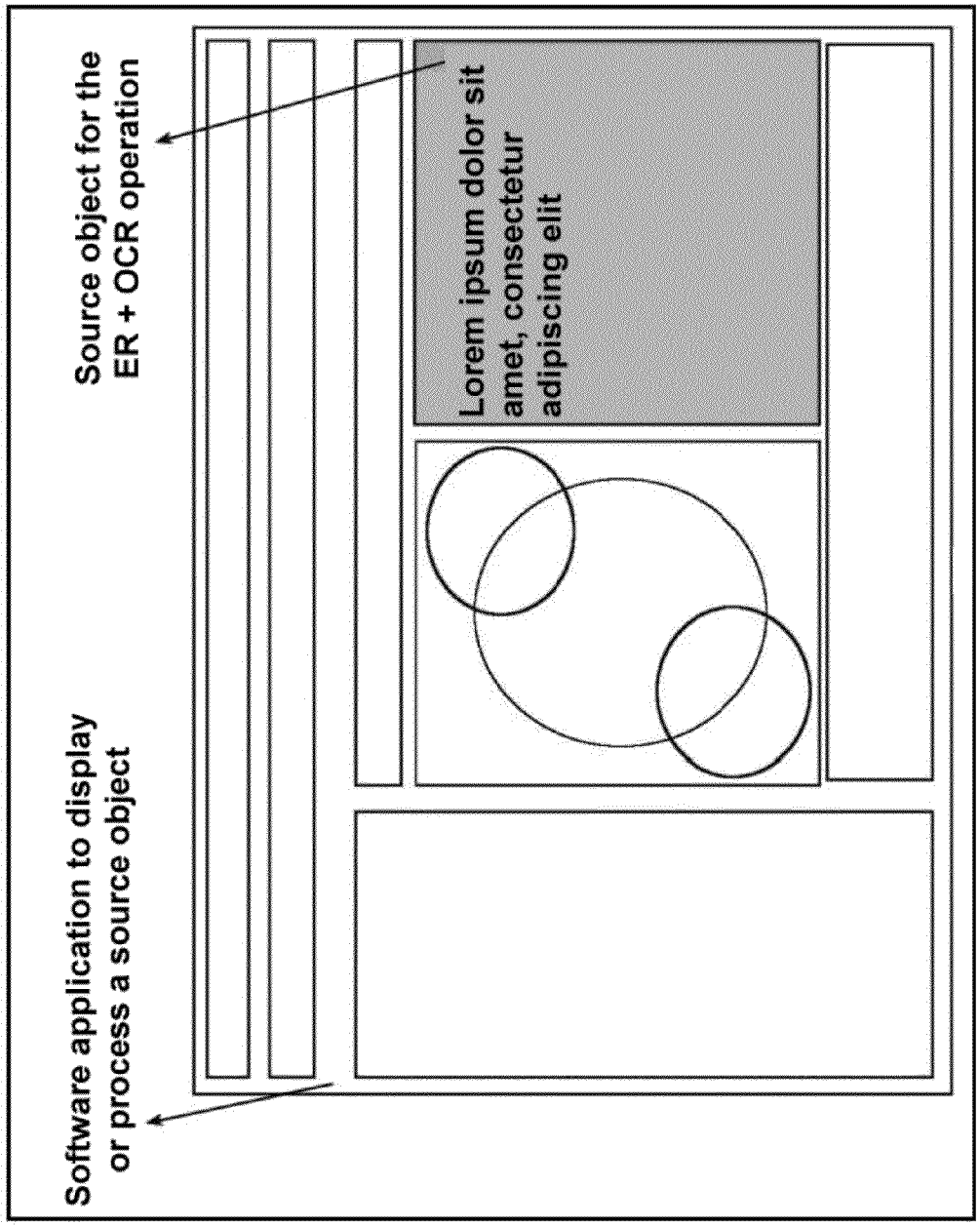
FIG. 1 is a perspective view of an exemplary embodiment of the invention illustrating an example of an image that a user is able to edit.

Referring to FIG. 1, the figure illustrates an example of the type of image that the system of the present invention enables a user to edit. The page displayed is a combination of images and text.

FIG. 1 optimally has a uniform background, which means that it should have the same color shade in the background, or slight variations of the same color. The background color should be consistent and follow the same pattern. The shape (or area or bounds) of the object needs to be clearly distinguished from the rest of the image/form. When the background is a mix of colors, the color at the point of mask insertion is selected. An alternate color may be chosen in the editing process. Inside the bounds, shape or area described above, there can be text (graphical representation of letters).

Figure 2:
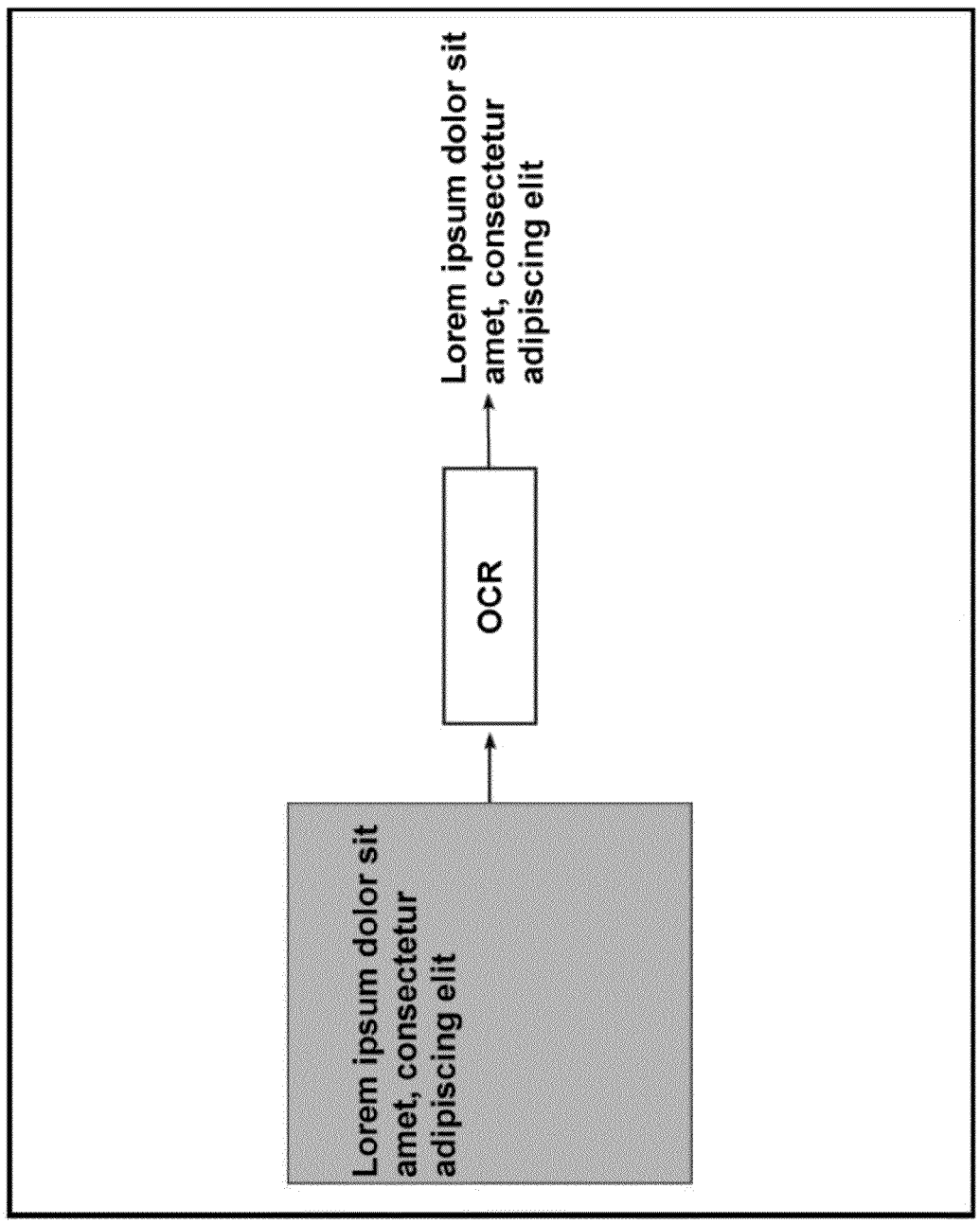
FIG. 2 is a perspective view of an exemplary embodiment of the invention illustrating the OCR component.

Referring to FIG. 2, a component in an exemplary embodiment of the invention enables a user to perform an Optical Character Recognition (OCR) operation on a selected area, the rectangular block labeled 1-1 of FIG. 1, in order to extract the text represented inside the bounds of the object's selected area.

When the area 1-1 does not contain text, then the component capable of performing an OCR operation on area 1-1 will not extract anything, and the result will be either indicate that no text was found and may display a message such as "No text value present in the selected region!".

Figure 3:
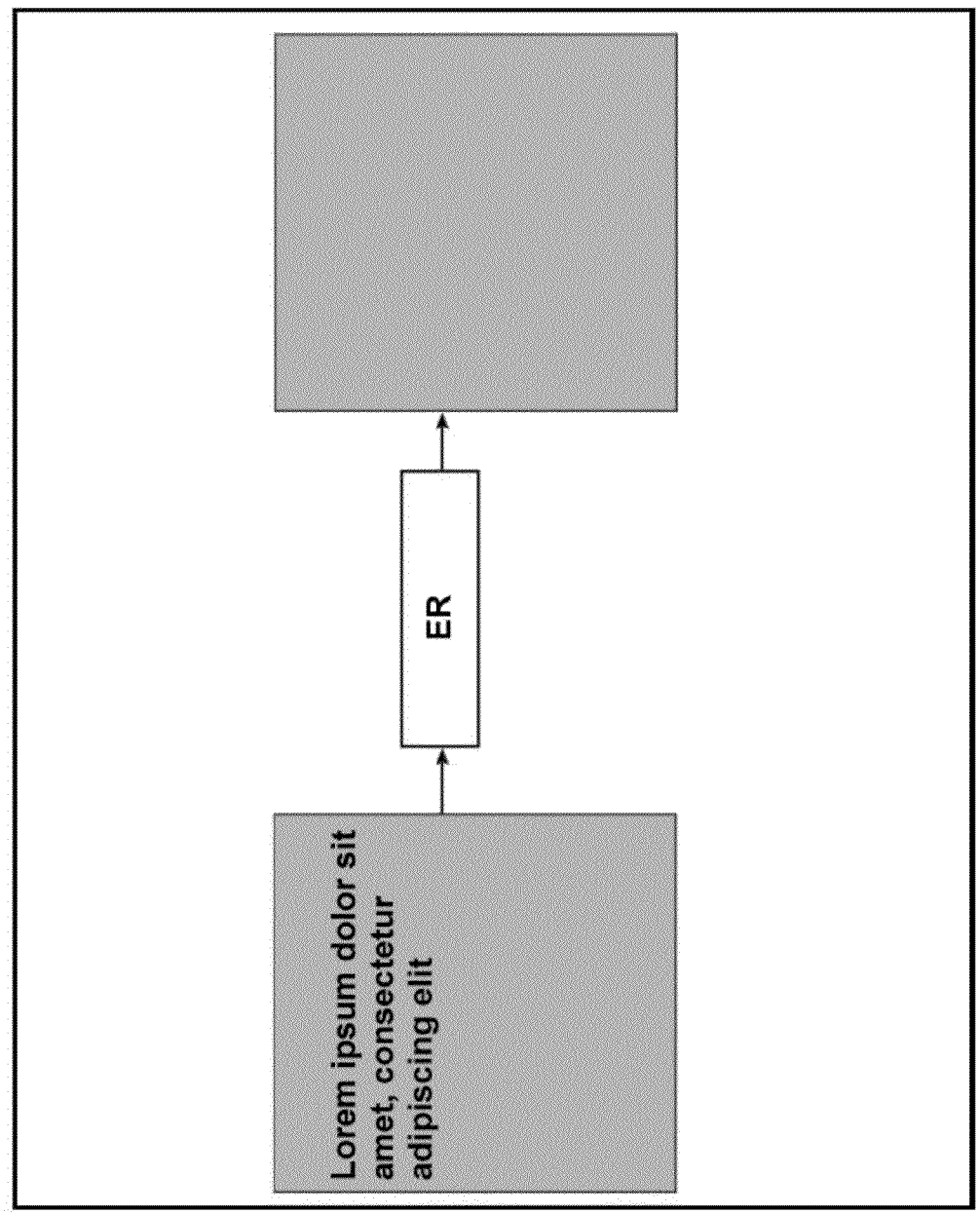
FIG. 3 is a perspective view of an exemplary embodiment of the invention illustrating the ER component.

Referring to FIG. 3, a component in an exemplary embodiment of the invention is able to perform an edge-recognition (ER) operation on the area 1-1, in order to determine a set of data which completely and uniquely defines the boundaries of said area 1-1. For example, the dataset can be represented by mathematical coordinates that define the geometrical shape with the smallest possible surface area and completely covers said area.

Figure 4:
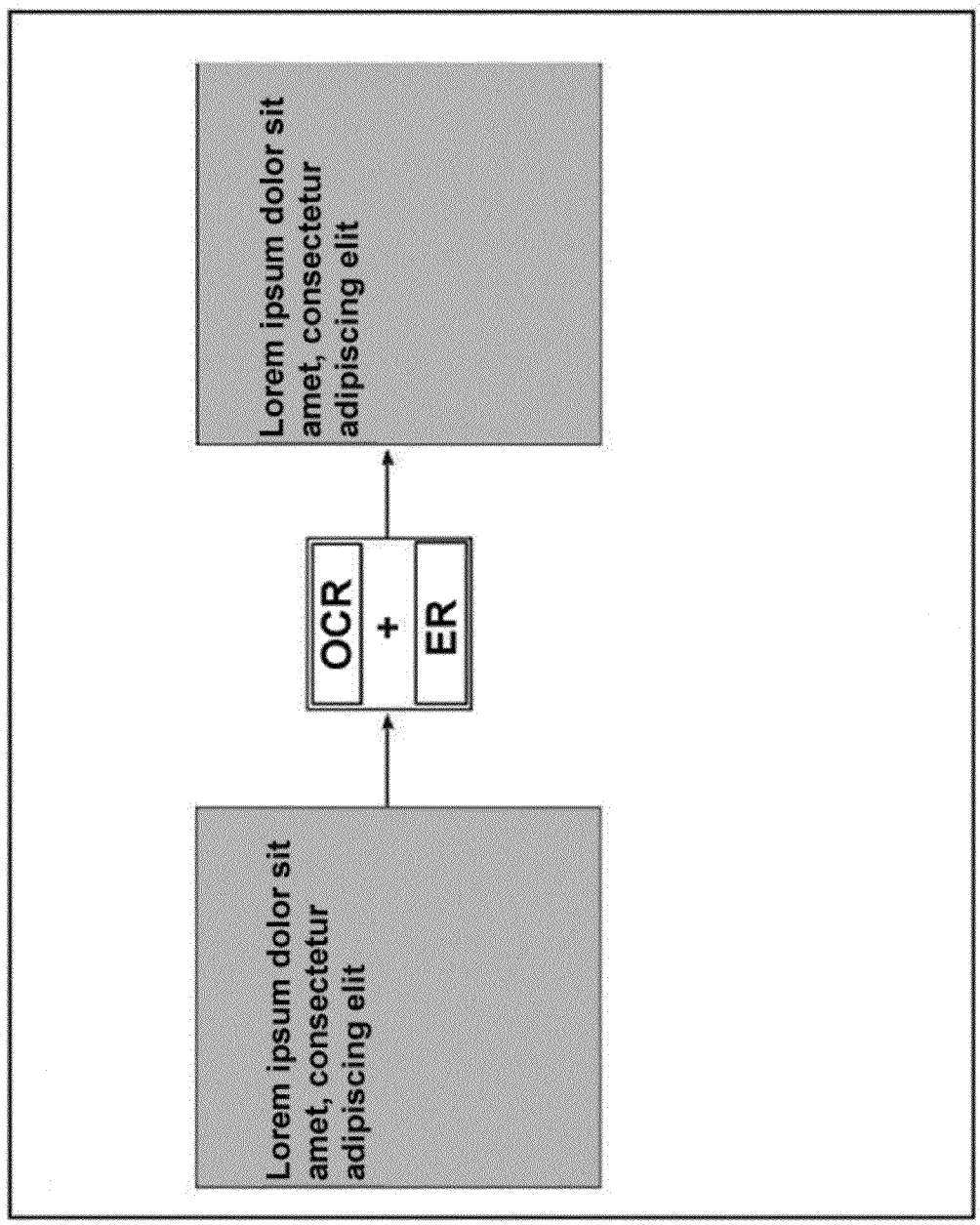
FIG. 4 is a perspective view of an exemplary embodiment of the invention illustrating the ER+OCR component.

The exemplary embodiment of the invention of FIG. 4 is a component that combines ER and OCR operations. This component is capable of processing a selected area such as said area 1-1 of FIG. 1 and extracting all the data necessary to create a new object 4-1. The ER+OCR component is also able to extract various other attributes and style data related to the selected area 1-1, such as but not limited to background color or pattern, border styles, text font, etc.

Figure 5:
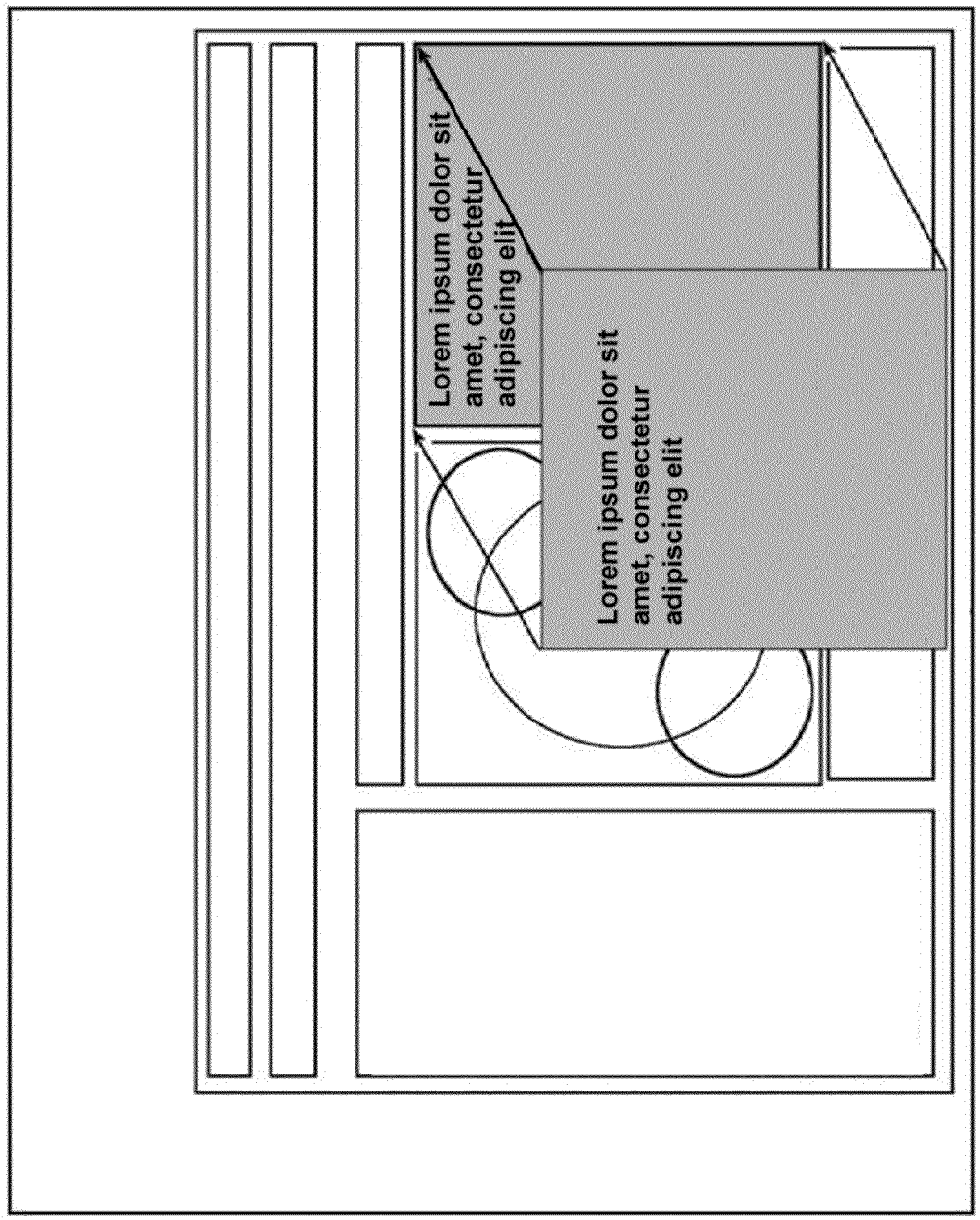
FIG. 5 is a perspective view of an exemplary embodiment of the invention illustrating application of a mask to an existing image using ER+OCR. The result contains the edges of the original shape and the text detected by the ER+OCR mechanism. The result has the same background and text as the original shape.
Figure 6:
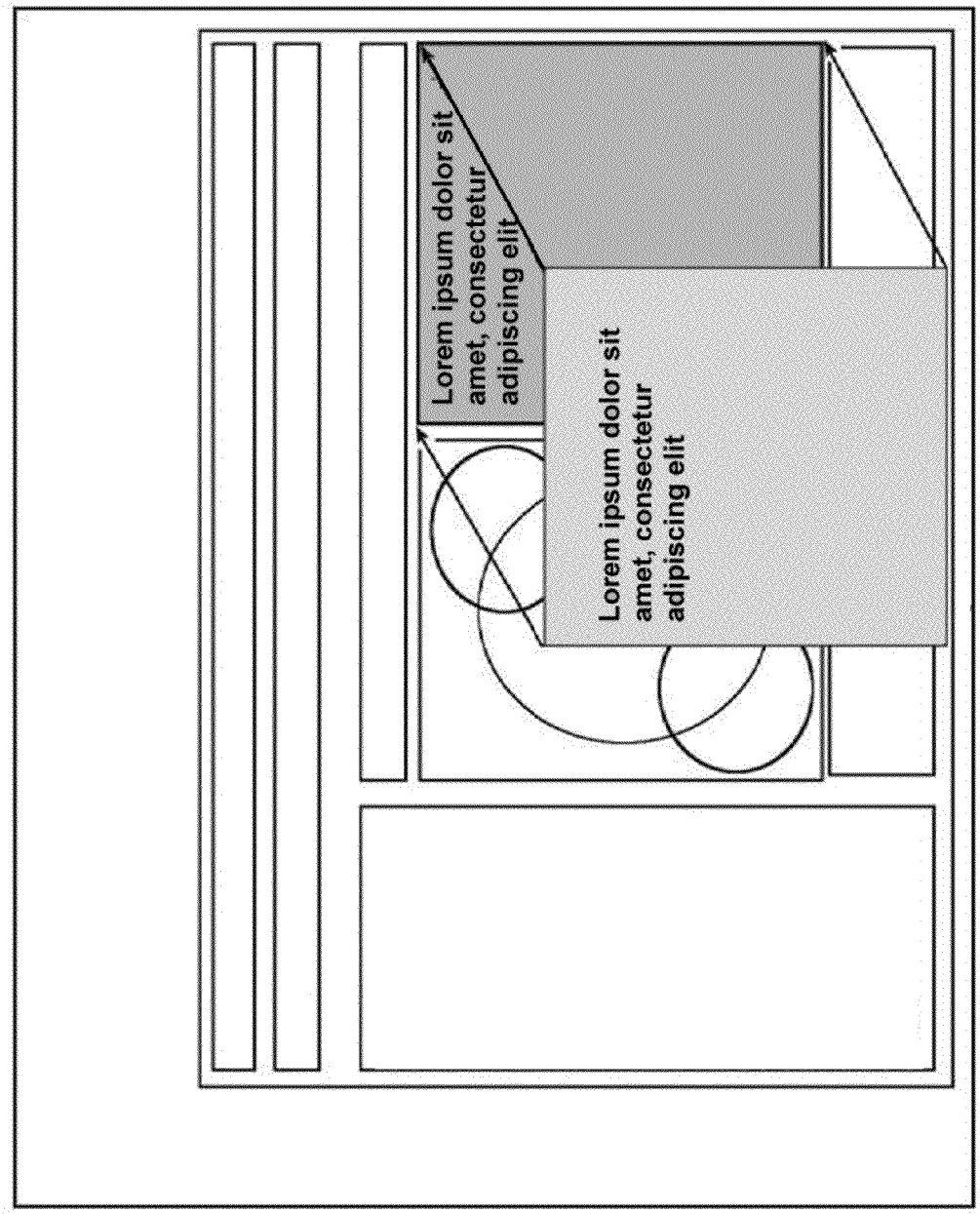
FIG. 6 is a perspective view of an exemplary embodiment of the invention illustrating application of a mask to an existing image using OCR only. The result is a different shape which contains the text detected by the OCR mechanism. The result only has the same text as the original shape

Referring to FIG. 5 and FIG. 6, an exemplary embodiment of the invention, enables a user to place or apply a mask over an area 1-1. The mask represents the editions that can be applied to area 1-1. Applying a mask to area 1-1 enables said area to be manipulated by actions such as (but not limited to) moving, resizing, applying different graphical styles to said area, and adding, editing or removing text in said area. The mask is created using the output (the results) of the ER+OCR operation of the current operation.

The mask may be composed of the mask body and the mask text. The mask body includes an object which represents the source object (an object described in area 1-1). The mask's body can have the same color and/or style (borders, background patterns, etc.) as the source object (as presented in FIG. 5) or can have a different color and/or style (as presented in FIG. 6).

The mask text is the text retrieved by the OCR component in FIG. 2 when applied onto the source object area 1-1. Depending on the accuracy of the OCR component, the text can be identical to the text represented on the source object area 1-1, or can have variations (missing letters, misinterpreted letters, etc.).

Figure 7:
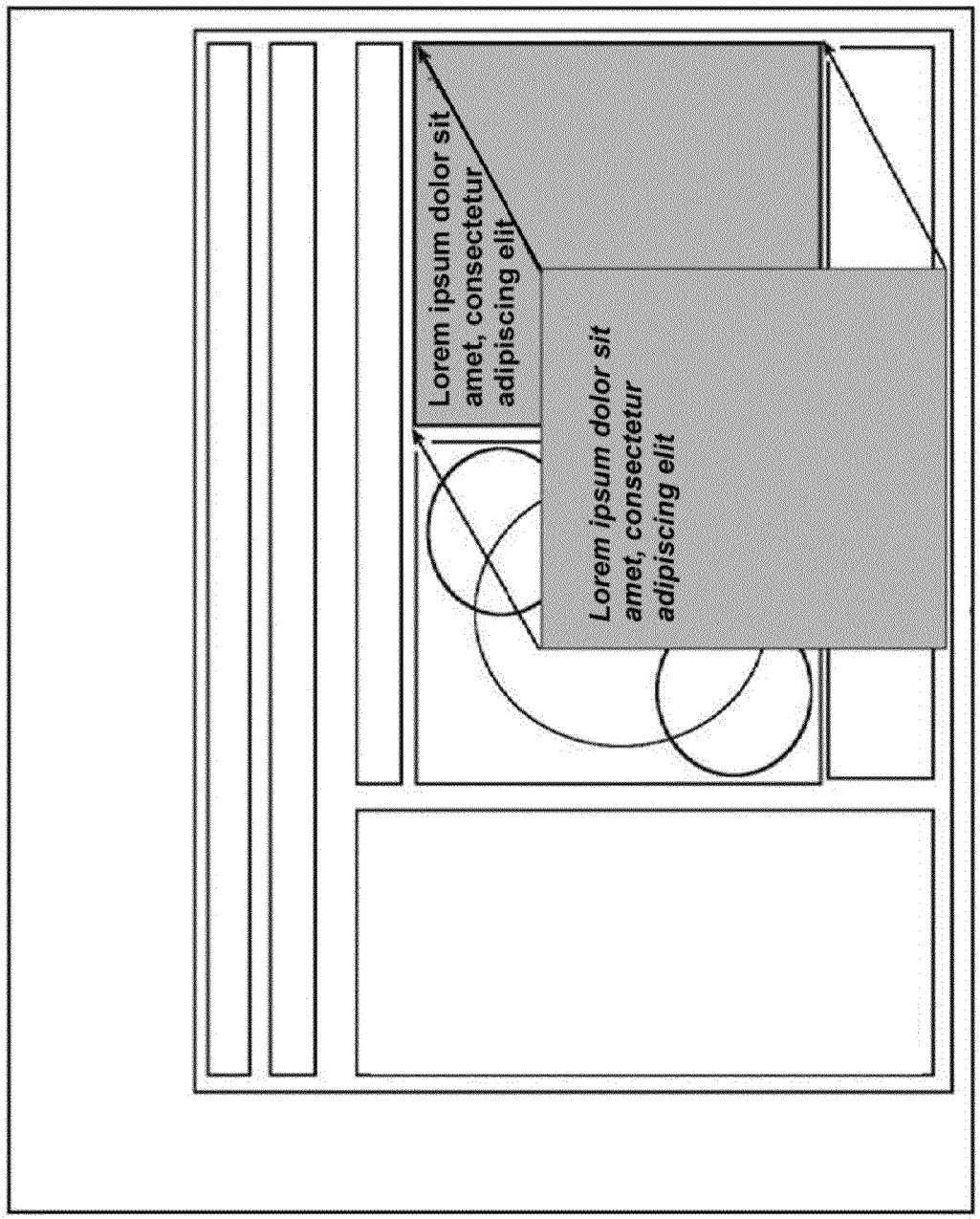
FIG. 7 is a perspective view of an exemplary embodiment of the invention illustrating application of a mask to an existing image with edited text.

The mask's text can either have the same font as the text of the source object or can have a different font (as presented in FIG. 7). The mask's background can be transparent in which case the graphical experience would be of a mask containing only text. If the source object defined in area 1-1 does not contain text, then the mask will either be composed of the mask body alone or can contain a predefined text, which suggests that the source object does not contain text.

Figure 8:
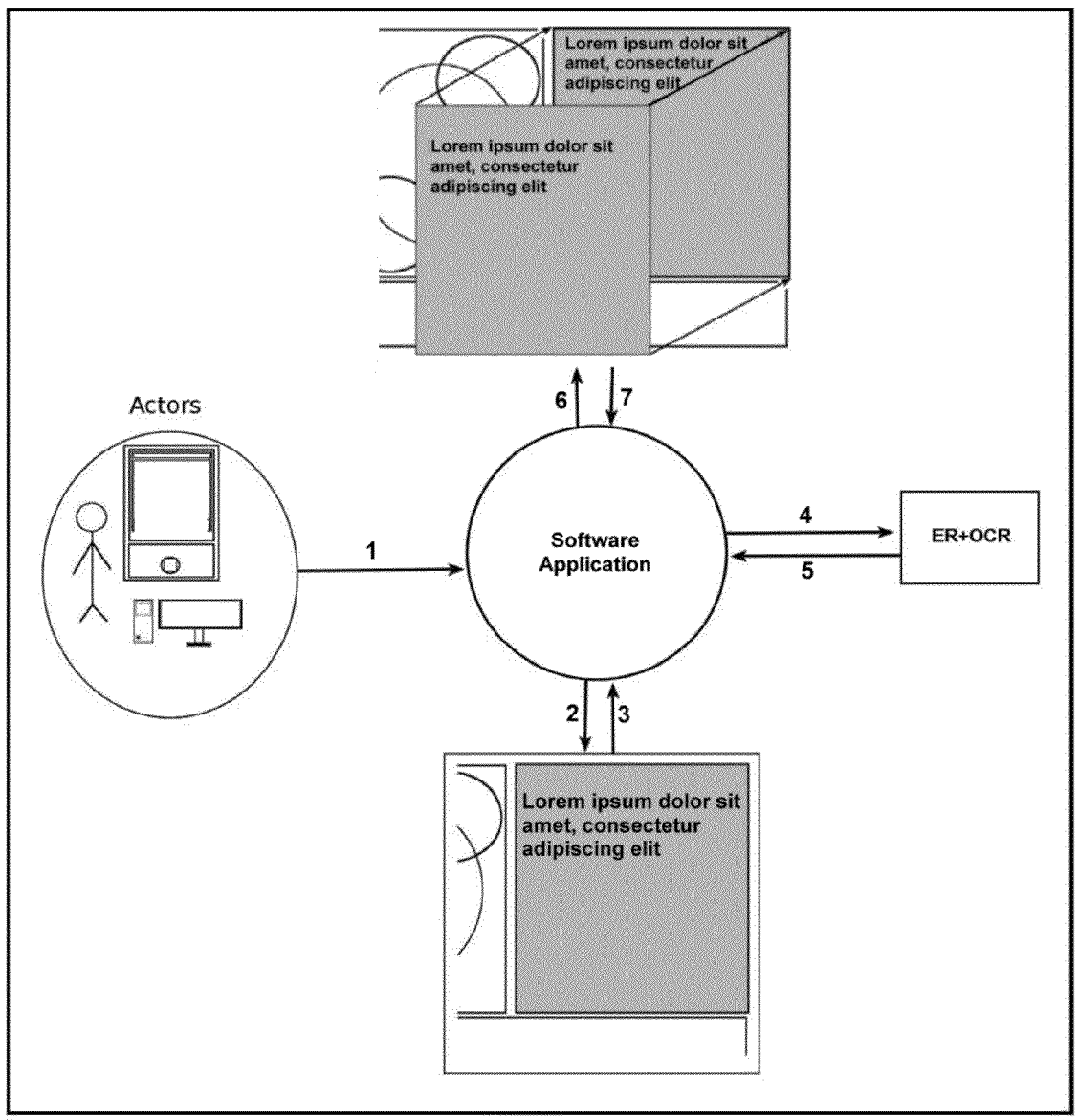
FIG. 8 is a perspective view of an exemplary embodiment of the invention illustrating an actor manipulating the application of the present invention via a $3^{rd}$ party application.

The actor, referred to in FIG. 8, may be the element which initiates the ER+OCR process. The actor may be a person who, by using a mouse cursor or keyboard, interacts with the application and initiates the ER+OCR operation. Alternatively, the actor may be an application or a suite of applications which can interact with the application and initiate the ER+OCR operation. Furthermore, the actor can be a mechanism that can click automatically on a region of the object, or automatically push a button.

Figure 9:
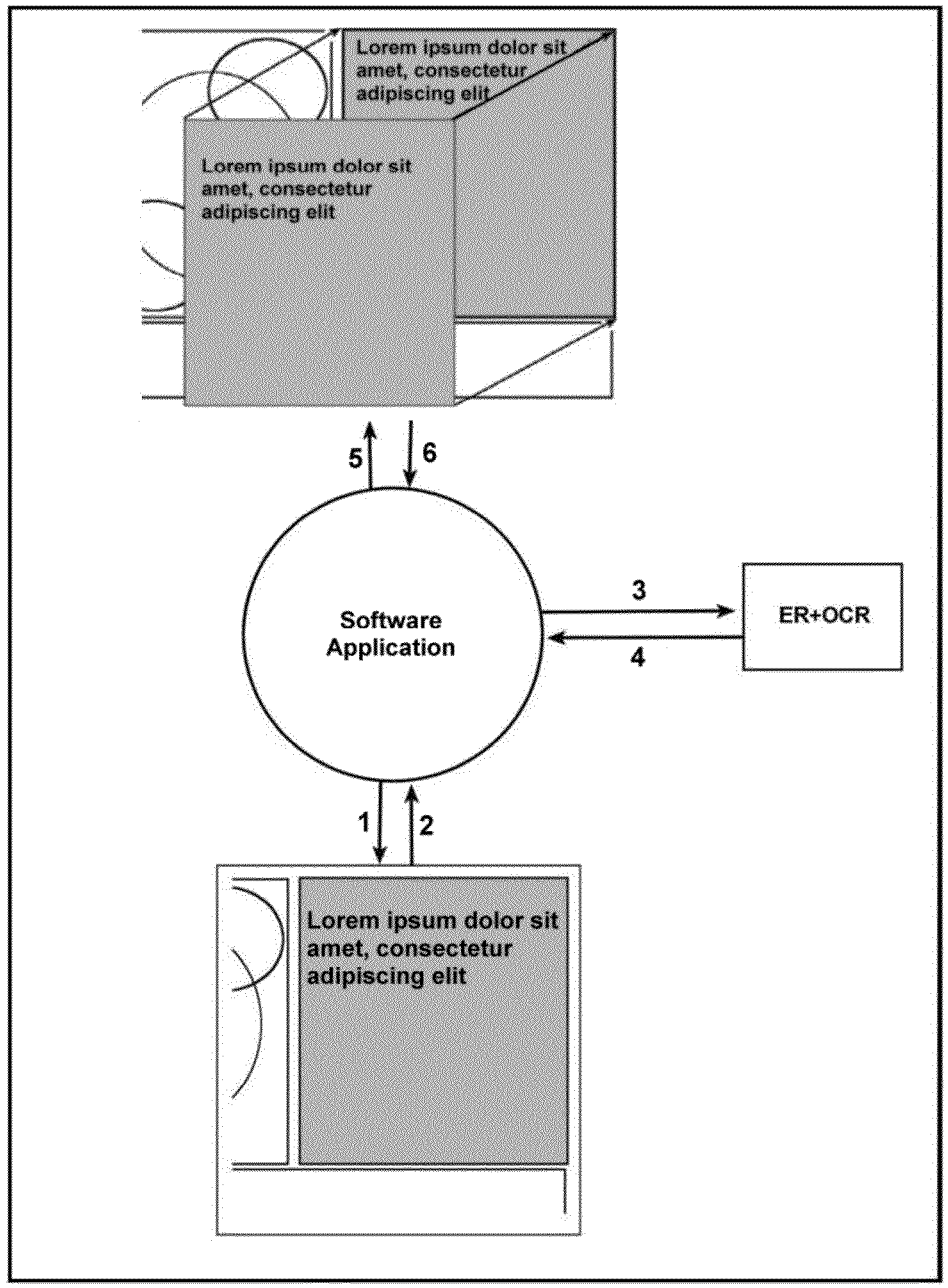
FIG. 9 is a perspective view of an exemplary embodiment of the invention illustrating use of the application of the present invention via a software application.

Referring to FIG. 9, an exemplary embodiment of the invention includes a software application that can process a source object and can generate a mask. The software application may run the ER+OCR process against the source object described in area 1-1 and uses its output to create the mask that covers the source object. The application described at this point can manipulate the resulting mask either automatically or indirectly at the command of an actor.

The application can manipulate the resulting mask, such as changing its position, resizing it, changing its graphical aspect (color, borders, text font, etc.). The application can also apply the manipulated mask to theThe exact set of functions that the application can apply onto the resulting mask is not germane to this invention. However it is important that the application can manipulate the mask in one way or another.

It should be understood, of course, that the foregoing relates to exemplary embodiments of the invention and that modifications may be made without departing from the spirit and scope of the invention as set forth in the following claims.

What is claimed is:

1. A document-processing computer-implemented method that is operable to edit an original image containing both text and non-text elements comprising:
   a component for selecting a specific area in the original image;
   an optical-character-recognition component for recognizing the text elements in the selected area;
   an edge-recognition component for recognizing boundaries in the selected area; and
   a component for applying a mask to the selected area;
   wherein a user manipulates the mask before applying the mask to the original image.

2. The document-processing computer-implemented method of claim 1 wherein manipulating the mask includes editing the text field within the mask.

3. The document-processing computer-implemented method of claim 1 wherein manipulating the mask includes editing the graphical characteristics of the mask.

4. The document-processing computer- implemented method of claim 1, wherein the edge-recognition and optical-character-recognition component enables the user to extract various attributes and style data related to the highlighted area that include background color, background pattern, border styles, text font and text size.

5. The document-process computer-implemented method of claim 1 wherein third party software application manipulates the original image and generates a mask automatically.

6. The document-process computer-implemented method of claim 5 wherein the third party software application manipulates the original image and generates a mask at the command of a user.

7. The document-process computer-implemented method of claim 6 wherein third party software application automatically manipulates the automatically generated mask.

8. The document-process computer-implemented method of claim 6 wherein third party software application automatically applies the manipulated mask to the original image.

9. The document-process computer-implemented method of claim 5 wherein third party software application automatically manipulates the automatically generated mask.

10. The document-process computer-implemented method of claim 5 wherein third party software application automatically applies the manipulated mask to the original image.

* * * * *